United States Patent
Lotito

(10) Patent No.: US 11,666,061 B2
(45) Date of Patent: Jun. 6, 2023

(54) CHEESE WRAP AND METHOD FOR MAKING A CHEESE WRAP

(71) Applicant: LOTITO FOODS HOLDING, LLC, Edision, NJ (US)

(72) Inventor: Christopher L. Lotito, Edison, NJ (US)

(73) Assignee: Lotito Foods Holdings, LLC, Edison, NJ (US)

( * ) Notice: Subject to any disclaimer, the term of this patent is extended or adjusted under 35 U.S.C. 154(b) by 130 days.

(21) Appl. No.: 17/383,167

(22) Filed: Jul. 22, 2021

(65) Prior Publication Data
US 2023/0026374 A1    Jan. 26, 2023

(51) Int. Cl.
A23C 19/09 (2006.01)
A23C 19/16 (2006.01)
A23C 19/068 (2006.01)
A23C 19/072 (2006.01)

(52) U.S. Cl.
CPC ...... *A23C 19/0908* (2013.01); *A23C 19/0684* (2013.01); *A23C 19/0688* (2013.01); *A23C 19/072* (2013.01); *A23C 19/0912* (2013.01); *A23C 19/166* (2013.01); *A23C 2250/10* (2013.01)

(58) Field of Classification Search
CPC ............ A23C 19/0908; A23C 19/0684; A23C 19/0688; A23C 19/072; A23C 19/0912; A23C 19/166; A23C 2250/10
See application file for complete search history.

(56) References Cited

U.S. PATENT DOCUMENTS

| 4,588,593 | A | 5/1986 | Barthelemy et al. |
| 5,243,899 | A | 9/1993 | Moshier |
| 5,795,613 | A | 8/1998 | Scharfmann et al. |
| 5,932,268 | A | 8/1999 | Thomas et al. |
| 2005/0196509 | A1 | 9/2005 | Murphy |
| 2005/0244541 | A1 | 11/2005 | Koka et al. |
| 2006/0110518 | A1 | 5/2006 | Thompson |
| 2009/0324795 | A1 | 12/2009 | Dieter |

(Continued)

FOREIGN PATENT DOCUMENTS

| CA | 2159229 C | 2/1999 |
| DE | 29 25 372 A1 | 1/1981 |

(Continued)

OTHER PUBLICATIONS

"Keto Cheese Wrap Recipe," Brilliantly Keto, Feb. 12, 2020 (online), Found online Jan. 9, 2023 <https://www.brilliantlyketo.com/keto-cheese-wrap-recipe/> (Year: 2020).*

(Continued)

*Primary Examiner* — Donald R Spamer
*Assistant Examiner* — Jeffrey D Benson
(74) *Attorney, Agent, or Firm* — Fox Rothschild LLP

(57) ABSTRACT

The invention relates to a method for preparing a heat treated and tempered cheese wrap, as well as the cheese wrap itself. The method includes melting previously refrigerated cheese into a disc shape, and subjecting the cheese disc to alternating heating and cooling steps to produce a pliable, low to no carbohydrate, and gluten free cheese wrap. The product can be used, for example, as a snack or as a bread substitute in sandwich wraps and roll ups.

19 Claims, 2 Drawing Sheets

(56) References Cited

U.S. PATENT DOCUMENTS

| | | | |
|---|---|---|---|
| 2010/0028498 | A1 | 2/2010 | Van Der Drift et al. |
| 2011/0045131 | A1 | 2/2011 | Ejnik |
| 2011/0229622 | A1 | 9/2011 | Merrill et al. |
| 2011/0250321 | A1 | 10/2011 | Everhart |
| 2017/0215450 | A1* | 8/2017 | Lotito .................. A23C 19/072 |

FOREIGN PATENT DOCUMENTS

| | | | |
|---|---|---|---|
| EP | 1 614 355 | A1 | 1/2006 |
| WO | 1992/007472 | A1 | 5/1992 |
| WO | 1994/23946 | A1 | 10/1994 |
| WO | 2005/107486 | A2 | 11/2005 |
| WO | 2014/158777 | A1 | 10/2014 |

OTHER PUBLICATIONS

Recipe for Parmesan Crisps, Gourmet (1994) www.epicurious.com/recipes/food/views/14947, 2 pgs.

European Extended Search Report from EP Application No. 17747916.9 dated Mar. 29, 2019; 7 pgs.

https://www.youtube.com/watch?v=aUEDC3jGmh0, Dec. 15, 2016.

Examination Report issued in counterpart Canadian Patent Application No. 3,012,126 dated Apr. 21, 2020; 3 pgs.

"Tortillas Made of Cheese Are Why You Should Order Off Menu At Los Taco," https://www.youtube.com/watch?v=C8cPH9-qjJ4, Nov. 20, 2015 (and associated pdf summary) (Year: 2015).

European Extended Search Report from related EP Application No. 2218654.5 dated Nov. 25, 2022; 10 pgs.

Communication from EP Application No. 17747916.9 dated Aug. 10, 2022.

Anonymous: "Low-Garb Snacks : Homemade Baked Cheese Crisps", Jan. 1, 2010 (Jan. 1, 2010), pp. 1-91, XP055948910, Retrieved from the Internet: URL:https://www.joyfulabode.com/low-carb-snacks-homemade-bakedcheese-crisps-recipe/.

* cited by examiner

CHEESE WRAP AND METHOD FOR MAKING A CHEESE WRAP

FIELD OF THE INVENTION

This invention relates to a cheese wrap and a method for manufacturing a cheese wrap with a heat treatment and tempering process to create a flexible cheese wrap that is capable of being rolled without crumbling at refrigerated and room temperatures.

BACKGROUND

Traditional, edible food wraps that are used for sandwiches and the like are made from flour, such as flour-based tortillas. The wraps are filled with a variety of other food ingredients and rolled to enclose the added food contents, such as in the shape of a burrito or crepe. However, for consumers who are on low carbohydrate, gluten-free, and keto-type diet plans, flour-based wraps are not ideal due to their high carbohydrate values. Thus, there is a need in the marketplace for a wrap for use as snacks and sandwiches that has little to no carbohydrates.

BRIEF SUMMARY OF THE INVENTION

A method for making an edible food product including the steps of melting previously refrigerated cheese into a disc shape to form a cheese disc, cooling the cheese disc under refrigeration to a temperature of about 40° F. to about 75° F., placing the cheese disc on an oven-safe device, in a first rapid heating step rapidly heating the cheese disc in an infrared heating device from a refrigerated temperature to a temperature of about 75° F. to about 150° F., in a first oven heating step further heating the cheese disc in an oven to a temperature of about 100° F. to about 175° F., in a first cooling step cooling the cheese disc to a temperature that is about 30° F. to about 60° F. lower than the temperature of the cheese disc coming out of the first oven heating step, in a second rapid heating step rapidly heating the cheese disc in an infrared heating device to a temperature of about 150° F. to about 215° F., in a second oven heating step further heating the cheese disc in an oven to a temperature of about 160° F. to about 250° F., in a second cooling step cooling the cheese disc to a temperature that is about 30° F. to about 60° F. lower than the temperature of the cheese disc coming out of the second oven heating step, and in a third cooling step transferring the cheese disc to a refrigerated environment that cools the cheese disc to a temperature of about 40° F. to about 70° F. in less than about ten minutes. The second oven heating step forms a skin on the cheese disc. The resulting edible food product is a flexible and pliable integrated cheese product at refrigerated and room temperatures, which can be rolled and folded without crumbling.

The method further includes the step of packaging the edible food product with additional edible food products by stacking the edible food products as separated with a separating material, such as parchment paper. The method of making an edible food product also further includes the step of subjecting the edible food product to an additional heating step to form a crispy cheese product.

The edible food product has a thickness of about 1/32" to about 3/16" and a diameter of about 3" to about 10". The edible food product is substantially flat and substantially smooth. The edible food product is formed of grated cheese such as, but not limited to parmesan cheese, cheddar cheese, Jarlsberg cheese, Mozzarella, Provolone, Jack, Swiss and/or combinations thereof. The edible food product is free from any flour.

The first and second rapid heating steps are enabled by an infrared heater. The infrared heating device and the oven are set at a temperature of about 200° F. to about 500° F. In the third cooling step, the cheese disc is cooled to the temperature of about 40° F. to about 70° F. in less than about ten minutes.

A method of making an edible food product including the steps of melting previously refrigerated cheese into a disc shape to form a cheese disc, cooling the cheese disc, placing the cheese disc on an oven-safe device, and subjecting the disc or cheese to a series of alternating heating and cooling phases to heat temper the cheese disc and create a modulus of elasticity in the cheese disc to form a foldable and rollable cheese wrap that can touch from end to end without crumbling at both room temperature and refrigerated temperatures.

A cheese wrap that is flexible and pliable at refrigerated and room temperatures, made by the process of melting previously refrigerated cheese into a disc shape to form a cheese disc, cooling the cheese disc under refrigeration to a temperature of about 40° F. to about 75° F., placing the cheese disc on an oven-safe device, in a first rapid heating step rapidly heating the cheese disc in an infrared heating device from a refrigerated temperature to a temperature of about 75° F. to about 150° F., in a first oven heating step further heating the cheese disc in an oven to a temperature of about 100° F. to about 175° F., in a first cooling step cooling the cheese disc to a temperature that is about 30° F. to about 60° F. lower than the temperature of the cheese disc coming out of the first oven heating step, in a second rapid heating step rapidly heating the cheese disc in an infrared heating device to a temperature of about 150° F. to about 215° F., in a second oven heating step further heating the cheese disc in an oven to a temperature of about 160° F. to about 250° F., in a second cooling step cooling the cheese disc to a temperature that is about 30° F. to about 60° F. lower than the temperature of the cheese disc coming out of the second oven heating step, and in a third cooling step transferring the cheese disc to a refrigerated environment that cools the cheese disc to a temperature of about 40° F. to about 70° F.

A cheese wrap made by the process of melting previously refrigerated cheese into a disc shape to form a cheese disc, cooling the cheese disc, placing the cheese disc on an oven-safe device, and subjecting the disc or cheese to a series of alternating heating and cooling phases to heat temper the cheese disc and create a modulus of elasticity in the cheese disc to form a foldable and rollable cheese wrap that can touch from end to end without crumbling at both room temperature and refrigerated temperatures.

DETAILED DESCRIPTION

Figure 1:
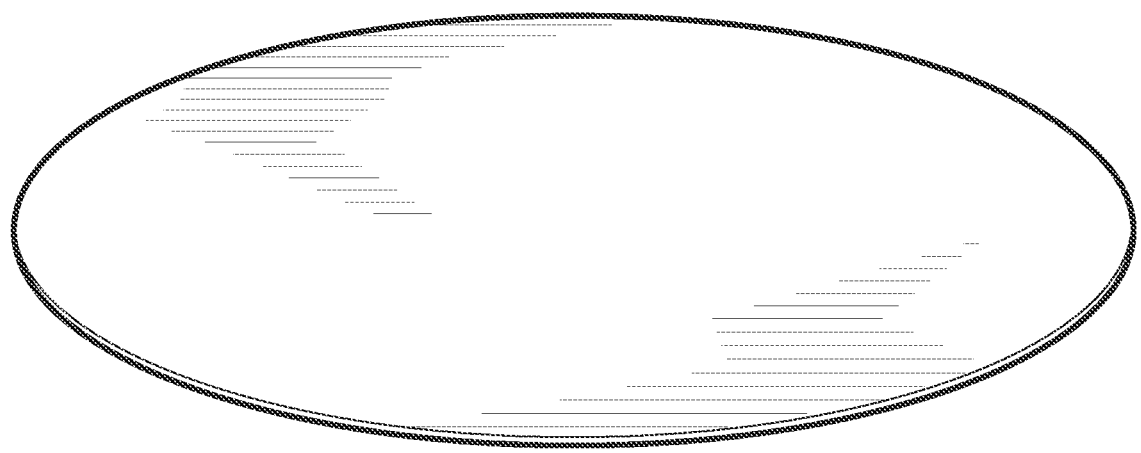
FIG. 1 is a perspective view of the cheese wrap of the present invention in a flat configuration.
Figure 2:
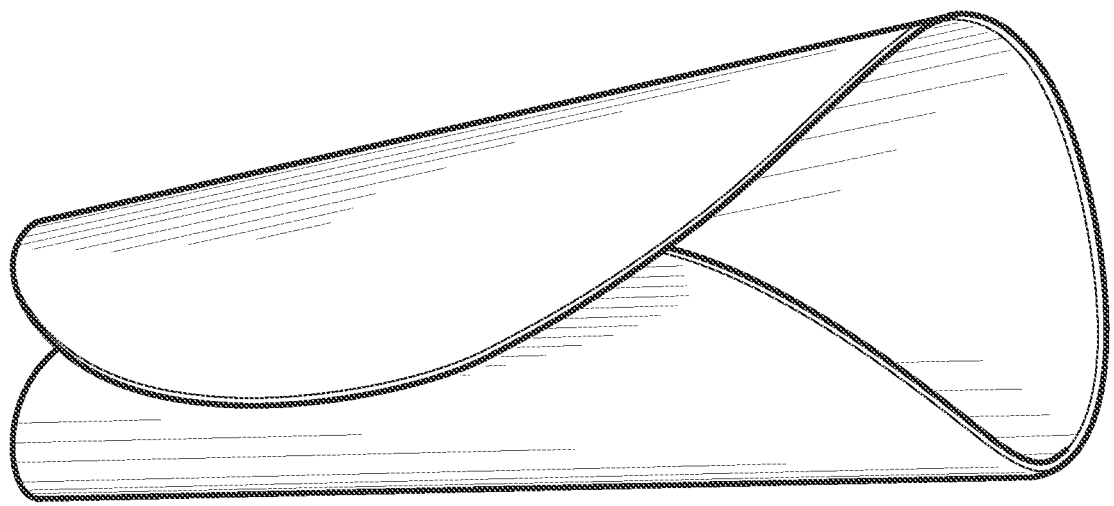
FIG. 2 is a perspective view of the cheese wrap in a rolled configuration.

The cheese wraps 10 of the present invention, as shown in FIGS. 1-2, are made of 100% cheese with no flour.

Therefore, the cheese wraps 10 of the present invention have little to no carbohydrates. Similar to a traditional flour-based tortilla or wrap, the cheese wraps 10 of the present invention are flexible at refrigerated and room temperatures. Specifically, the cheese wraps 10 may be folded over or rolled such that the ends overlap, without crumbling, to enclose the contents of additional food ingredients, as shown in FIG. 2. As explained below, the cheese wraps 10 of the present invention are made by a process of heat treating and tempering the cheese to produce the flexible, rollable, flat and smooth sheet of 100% cheese.

Figure 3:
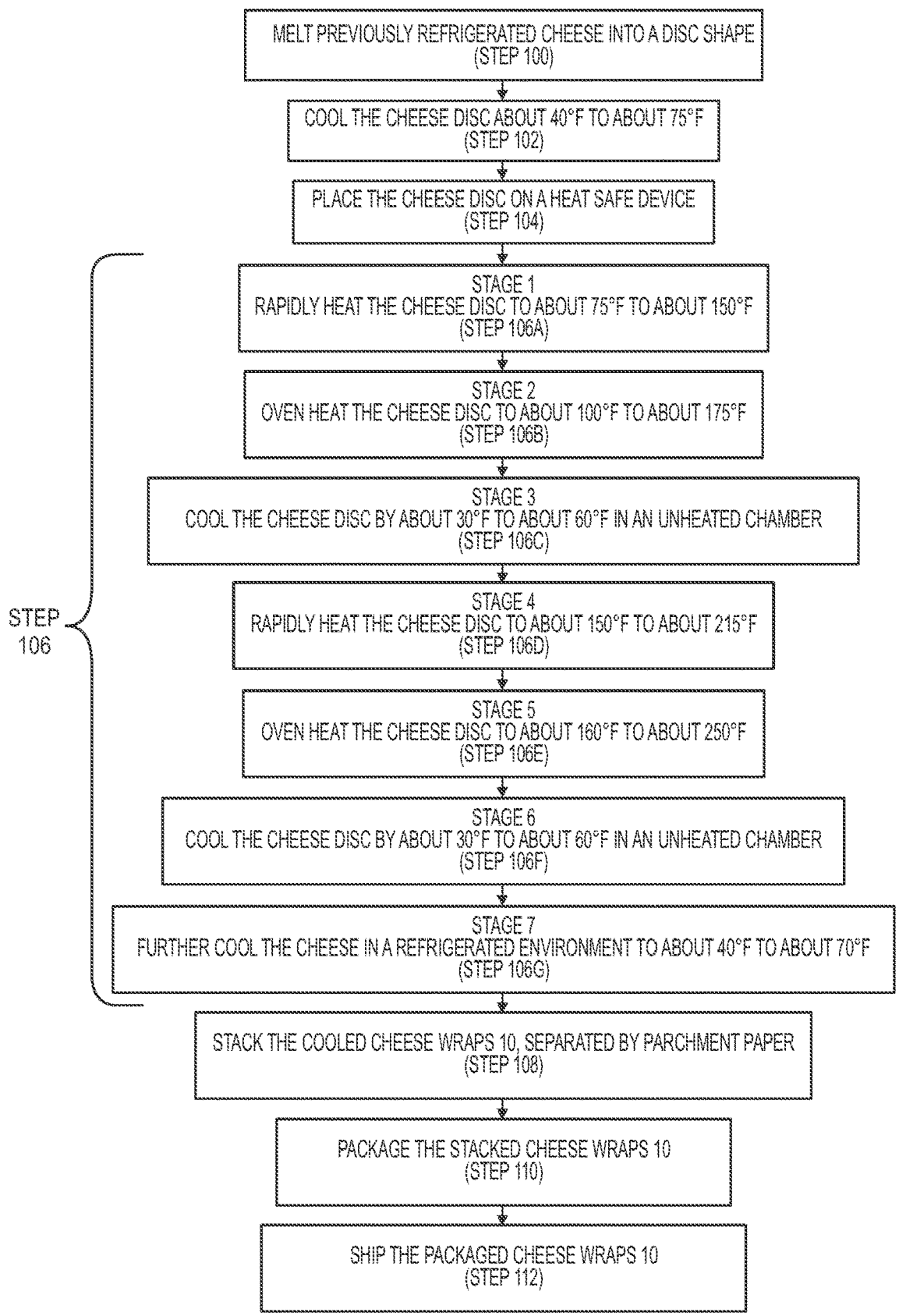
FIG. 3 is a flowchart of the method of making the cheese wrap.

The cheese wraps 10 may be formed of one type of cheese or a mixture of cheeses. Many types of cheese can be used such as parmesan, pecorino, asiago, cheddar, manchego, montasio, Jarlsberg, Mozzarella, Jack and/or provolone. Referring now to FIG. 3, each cheese wrap 10 is made by taking the cheese or combination of cheeses that has been stored under refrigeration and melting the cheese in a cooker to a temperature of about 100° F. to about 200° F., resulting in a disc-like form (step 100). The cheese disc is then cooled to a temperature of about 40° F. to about 75° F. under refrigeration (step 102). The cheese disc is placed on a baking or other oven-safe material, such as parchment paper or other material to prevent adherence of the cheese to the baking sheet (step 104). For each cheese wrap 10, a sufficient quantity of cheese is formed into the disc shape to ultimately form a finished cheese wrap 10 of desired size and thickness. For example, the finished cheese wrap 10 could be made with varying diameters, ranging from about 3" to about 10". The thickness of the finished wrap 10 may range from about 1/32" to about 3/16".

Once the cheese disc is on the baking sheet, it is conveyed through a heat treatment process that raises and lowers the temperature of the cheese disc at multiple intervals within the equipment in order to expand and contract the molecular structure of the cheese (step 106). This creates a modulus of elasticity, thus creating a finished cheese product that does not crack or crumble when rolled or folded at refrigerated and room temperatures.

As shown in FIG. 3, the stages of the heat treatment and tempering process (step 106) for making the cheese wrap 10 are as follows:

STAGE 1 (step 106A)—The cheese disc is moved through an infrared heating chamber set at about 200° F. to about 500° F., depending on the cheese or mixture of cheeses. The infrared heating chamber rapidly increases the temperature of the cheese disc from a refrigerated temperature to a temperature of about 75° F. to about 150° F.

STAGE 2 (step 106B)—The cheese disc is moved through a gas or electric oven system, also set at about 200° F. to about 500° F. depending on the cheese or mixture of cheeses. The oven system further heats the cheese disc to a temperature of about 100° F. to about 175° F.

STAGE 3 (step 106C)—The cheese disc is conveyed through a non-heated section that reduces the temperature of the cheese disc to about 30° F. to about 60° F. lower than the temperature of the cheese disc when it comes out of Stage 2 (step 106B), depending on the cheese or mixture of cheeses.

STAGE 4 (step 106D)—The cheese disc is again conveyed through an infrared heating chamber that rapidly increases the temperature of the cheese disc to about 150° F. to about 215° F. The infrared heating chamber is set at a temperature of about 200° F. to about 500° F., depending on the cheese or mixture of cheeses.

STAGE 5 (step 106E)—The cheese disc is again moved through a gas or electric oven system that further heats the cheese disc such that a slight skin is formed on the cheese disc. Such skin helps provide elasticity in the resulting cheese wrap 10. The oven temperature is set at about 200° F. to about 500° F., depending on the cheese or mixture of cheeses and the cheese disc is again raised in temperature to about 160° F. to about 250° F.

STAGE 6 (step 106F)—The cheese disc is again conveyed through a non-heated section that reduces the temperature of the cheese disc to about 30° F. to about 60° F. lower than the temperature of the cheese disc when it comes out of Stage 5 (step 106E), depending on the cheese or mixture of cheeses.

STAGE 7 (step 106G)—The cheese disc is conveyed to an elevated serpentine conveyor system in a refrigerated room which reduces the temperature of the cheese disc to below room temperature, such as to a temperature of about 40° F. to about 70° F., in under about ten minutes. This step completes the process of creating the modulus of elasticity for the cheese disc and results in the final cheese wrap 10 product that is at an ideal temperature for packaging.

The finished cheese wraps 10 may be prepared for packaging by separating the wraps 10 with sheets of parchment paper and stacking them one upon the other (step 108). The stacked cheese wraps 10 may then be enclosed in packaging and sealed, e.g., in a vacuum packed, or modified atmosphere, sealable plastic container, such as a bag (step 110). Given that the cheese wrap 10 is a natural cheese product with no additives, the product is shipped (step 112) in a refrigerated state and is also stored under refrigeration for its noted shelf life. The present invention is a "ready to use" cheese wrap 10, which may be consumed any time during its coded shelf life.

A heat treated and tempered cheese wrap 10 product, made in accordance with the process described above, is stable and avoids the fragility and crumbling associated with cheese products not made in accordance with this process. As a result, the partially cooked cheese product of the invention can be used as a gluten-free, "all cheese" wrap 10 product which replaces flour-based products such as tortillas, pitas, crepes, or other flat forms of bread that are intended to enclose or surround other good contents. As the cheeses used in the invention are known to be low to carbohydrate free (as defined by the USDA), the flexible cheese product can serve as a high protein, low to no carbohydrate and Gluten free alternative.

While the cheese wraps 10 formed by the method described above may be used as-is, in their refrigerated "ready to use" state, the cheese wrap 10 may be alternatively further cooked by the end user to form a cheese crisp. More specifically, the end user, such as consumer or preparer, may bake the refrigerated cheese wrap 10 product at about 375° F. for about 15 minutes, or heat the cheese wrap 10 in a microwave for about 45 to about 90 seconds, to crisp the cheese wrap 10. For a very short window of time (about 15 sec to about 1 minute) after this additional heating process, the consumer or preparer can shape the cheese wrap 10, such as by molding it over a cup or other receptacle, rolling it into a tube or cone, and so forth, before it hardens. Larger shapes may be molded into bowls or other receptacles to hold salad, pasta, etc.

The terms and expression which have been employed are used as terms of description and not of limitation, and there is no intention in the use of such terms and expression of excluding any equivalents of the features shown and described or portions thereof, it being recognized that various modifications are possible within the scope of the invention.

The invention claimed is:

1. A method for making an edible food product comprising the steps of:
   melting previously refrigerated cheese into a disc shape to form a cheese disc;
   cooling the cheese disc under refrigeration to a temperature of about 40° F. to about 75° F.;
   placing the cheese disc on an oven-safe device;
   in a first rapid heating step, rapidly heating the cheese disc in an heating device from a refrigerated temperature to a temperature of about 75° F. to about 150° F.;
   in a first oven heating step, further heating the cheese disc in an oven to a temperature of about 100° F. to about 175° F.;
   in a first cooling step, cooling the cheese disc to a temperature that is about 30° F. to about 60° F. lower than the temperature of the cheese disc coming out of the first oven heating step;
   in a second rapid heating step, rapidly heating the cheese disc in an heating device to a temperature of about 150° F. to about 215° F.;
   in a second oven heating step, further heating the cheese disc in an oven to a temperature of about 160° F. to about 250° F.;
   in a second cooling step, cooling the cheese disc to a temperature that is about 30° F. to about 60° F. lower than the temperature of the cheese disc coming out of the second oven heating step; and
   in a third cooling step, transferring the cheese disc to a refrigerated environment that cools the cheese disc to a temperature of about 40° F. to about 70° F.

2. The method of claim 1 wherein the second oven heating step forms a skin on the cheese disc.

3. The method of claim 1 further comprising a step of packaging the edible food product with additional edible food products by stacking the edible food products as separated with a separating material.

4. The method of claim 3 wherein the separating material is parchment paper.

5. The method of claim 1 wherein the first and second rapid heating steps are enabled by an infrared heater.

6. The method of claim 1 wherein the edible food product is a flexible and pliable integrated cheese product at refrigerated and room temperatures, which can be rolled and folded without crumbling.

7. The method of claim 1 wherein the edible food product has a thickness of about 1/32" to about 3/16".

8. The method of claim 1 wherein the edible food product has a diameter of about 3" to about 10".

9. The method of claim 1 wherein the edible food product is substantially flat and substantially smooth.

10. The method of claim 1 wherein the edible food product is formed of grated cheese.

11. The method of claim 1 wherein the edible food product is made of cheese selected from the group consisting of natural cheese, such as, but not limited to parmesan cheese, cheddar cheese, Jarlsberg cheese, Mozzarella, Provolone, Jack, Swiss and/or combinations thereof.

12. The method of claim 1 wherein the edible food product is formed essentially or entirely of cheese.

13. The method of claim 1 wherein the edible food product is free from any flour.

14. The method of claim 1 further comprising the step of subjecting the edible food product to an additional heating step to form a crispy cheese product.

15. The method of claim 1 wherein the heating device and the oven are set at a temperature of about 200° F. to about 500° F.

16. The method of claim 1 wherein in the third cooling step, the cheese disc is cooled to the temperature of about 40° F. to about 70° F. in less than about ten minutes.

17. A method of making an edible food product comprising the steps of:
   melting previously refrigerated cheese into a disc shape to form a cheese disc;
   cooling the cheese disc;
   placing the cheese disc on an oven-safe device; and
   subjecting the disc or cheese to a series of alternating heating and cooling phases to heat temper the cheese disc and create a modulus of elasticity in the cheese disc to form a foldable and rollable cheese wrap that can touch from end to end without crumbling at both room temperature and refrigerated temperatures.

18. A cheese wrap that is flexible and pliable at refrigerated and room temperatures, made by the process of:
   melting previously refrigerated cheese into a disc shape to form a cheese disc;
   cooling the cheese disc under refrigeration to a temperature of about 40° F. to about 75° F.;
   placing the cheese disc on an oven-safe device;
   in a first rapid heating step, rapidly heating the cheese disc in an heating device from a refrigerated temperature to a temperature of about 75° F. to about 150° F.;
   in a first oven heating step, further heating the cheese disc in an oven to a temperature of about 100° F. to about 175° F.;
   in a first cooling step, cooling the cheese disc to a temperature that is about 30° F. to about 60° F. lower than the temperature of the cheese disc coming out of the first oven heating step;
   in a second rapid heating step, rapidly heating the cheese disc in an heating device to a temperature of about 150° F. to about 215° F.;
   in a second oven heating step, further heating the cheese disc in an oven to a temperature of about 160° F. to about 250° F.;
   in a second cooling step, cooling the cheese disc to a temperature that is about 30° F. to about 60° F. lower than the temperature of the cheese disc coming out of the second oven heating step; and
   in a third cooling step, transferring the cheese disc to a refrigerated environment that cools the cheese disc to a temperature of about 40° F. to about 70° F.

19. A cheese wrap made by the process of:
   melting previously refrigerated cheese into a disc shape to form a cheese disc;
   cooling the cheese disc;
   placing the cheese disc on an oven-safe device; and
   subjecting the cheese disc to a series of alternating heating and cooling phases to heat temper the cheese disc and create a modulus of elasticity in the cheese disc to form a foldable and rollable cheese wrap that can touch from end to end without crumbling at both room temperature and refrigerated temperatures.

* * * * *